US012768641B2

(12) United States Patent
Stefer et al.

(10) Patent No.: US 12,768,641 B2
(45) Date of Patent: Oct. 20, 2026

(54) COORDINATE MEASURING MACHINE, LIGHT SOURCE AND METHOD

(71) Applicant: Klingelnberg GmbH, Hückeswagen (DE)

(72) Inventors: Jonas Stefer, Wipperfürth (DE); Markus Finkeldey, Hattingen (DE)

(73) Assignee: KLINGELNBERG GMBH, Hückeswagen (DE)

( * ) Notice: Subject to any disclaimer, the term of this patent is extended or adjusted under 35 U.S.C. 154(b) by 172 days.

(21) Appl. No.: 18/497,555

(22) Filed: Oct. 30, 2023

(65) Prior Publication Data

US 2024/0151513 A1 May 9, 2024

(30) Foreign Application Priority Data

Nov. 3, 2022 (EP) .................................... 22205389

(51) Int. Cl.
*G01B 11/00* (2006.01)
*G01B 5/012* (2006.01)

(52) U.S. Cl.
CPC ............ *G01B 11/005* (2013.01); *G01B 5/012* (2013.01)

(58) Field of Classification Search
CPC .... G01B 11/005; G01B 11/007; G01B 5/008; G01B 5/012; G01B 21/047; G01B 11/25; G01B 2210/50; G01B 11/24; G01B 2210/58; G01B 11/026; G01B 11/2513; G01B 11/03; G01B 11/002; G01B 11/0608; G01B 21/04; G01B 21/042; G01B 11/2509; G01B 11/2518; G01B 21/045; G01B 11/245; G01B 11/2545;
(Continued)

(56) References Cited

U.S. PATENT DOCUMENTS

2011/0242496 A1* 10/2011 Kimoto .................. G03B 21/16 353/30
2015/0009484 A1* 1/2015 Sesko .................... G01B 11/14 356/3
(Continued)

FOREIGN PATENT DOCUMENTS

CN 1174218 C * 11/2004 ........... G01B 11/007
EP 1391691 A1 * 2/2004 ............ G01B 11/12
(Continued)

*Primary Examiner* — Michael P Stafira
(74) *Attorney, Agent, or Firm* — CANTOR COLBURN LLP

(57) ABSTRACT

A coordinate measuring machine includes two or more linear axes, at least one rotational axis, an optical distance sensor for detecting measuring points on a workpiece to be measured, and a light source. The linear axes and rotational axis are adapted to carry out relative movements between the workpiece to be measured and the optical distance sensor. The light source is adapted to provide source light for the optical distance sensor and includes: an illuminant mounted on a carrier board and a material which emits broadband light under excitation, a laser for exciting the illuminant, a device for actively regulating the light intensity of the source light generated by the light source, a device for actively regulating a temperature within the light source, an optical system, and a light guide coupled to the optical distance sensor. The optical system is adapted to focus the source light into the light guide.

14 Claims, 2 Drawing Sheets

(58) Field of Classification Search

CPC .. G01B 11/00; G01B 5/0014; G01B 11/2441; G01B 2210/60; G01B 7/008; G01B 11/02; G01B 11/14; G01B 11/26; G01B 9/02007; G01B 9/02091; G01B 9/02044; G01B 9/02068; G01B 1/00; G01B 2290/70; G01B 9/02003; G01B 9/02004; G01B 9/02028; G01B 9/02048; G01B 9/02063; G01B 2290/15; G01B 9/0207; G01B 11/2416; G01B 11/272; G01B 11/254; G01B 2290/25; G01B 2290/60; G01B 9/02008; G01B 9/02019; G01B 9/02027; G01B 11/022; G01B 11/303; G01B 9/02002; G01B 9/02024; G01B 11/18; G01B 11/30; G01B 9/02015; G01B 9/0205; G01B 11/08; G01B 11/2433; G01B 21/06; G01B 2210/52; G01B 2290/65; G01B 9/02018; G01B 11/024; G01B 11/028; G01B 11/0616; G01B 11/22; G01B 11/255; G01B 11/27; G01B 13/22; G01B 15/00; G01B 21/00; G01B 21/32; G01B 5/004; G01B 7/012; G01B 7/02; G01B 7/30; G01B 9/02001; G01B 9/02029; G01B 9/02057; G01B 9/02058; G01B 9/02067; G01B 9/02075; G01B 9/0209; G01B 9/021; G01B 11/06; G01B 11/12; G01B 11/2504; G01B 11/2527; G01B 11/2531; G01B 11/306; G01B 2290/30; G01B 5/0004; G01B 5/0011; G01B 5/0016; G01B 5/016; G01B 9/02017; G01B 9/0203; G01B 9/02034; G01B 9/02061; G01B 9/02064; G01B 9/02072; G01B 9/02083

See application file for complete search history.

(56) References Cited

U.S. PATENT DOCUMENTS

| | | | | |
|---|---|---|---|---|
| 2017/0010452 | A1* | 1/2017 | Patzwald | G01B 11/026 |
| 2017/0276471 | A1* | 9/2017 | Jiang | G01B 9/02044 |
| 2020/0378747 | A1 | 12/2020 | Sesko | |
| 2022/0196387 | A1* | 6/2022 | Ettelt | G01B 11/026 |

FOREIGN PATENT DOCUMENTS

| | | | | |
|---|---|---|---|---|
| EP | 3441712 | A1 * | 2/2019 | G01B 11/2416 |
| EP | 3786573 | A1 * | 3/2021 | G01B 11/005 |

* cited by examiner

COORDINATE MEASURING MACHINE, LIGHT SOURCE AND METHOD

CROSS-REFERENCE TO RELATED APPLICATIONS

This application claims the benefit of European patent application 22205389.4 filed 3 Nov. 2022, the disclosure of which is incorporated herein by reference in its entirety.

TECHNICAL FIELD

The present disclosure relates to a coordinate measuring machine. The disclosure further relates to a light source and methods for operating the coordinate measuring machine and the light source.

BACKGROUND

Coordinate measuring machines are used in gear metrology to determine deviations of a gearing to be manufactured from a specified nominal geometry before or between manufacturing steps or to determine the quality of a manufactured gearing.

Coordinate measuring machines used in gear metrology often differ from conventional gantry-type coordinate measuring machines in that they are built centrally around a rotary table or a rotary axis. The rotary table is used to hold the gearing to be measured and to rotate the gearing to be measured around its own axis during the measurement.

Up to now, tactile measuring systems have achieved the highest measuring accuracy in gear metrology. Such tactile measuring systems feature, for example, a measuring probe that has a shaft with a probe ball attached to the end of this shaft. For tactile measurement of the geometry of a gearing, the probe is moved into a tooth space and brought into contact with a tooth flank of the gearing. The measuring probe can be moved into contact with the tooth flank in the profile and/or flank direction in order to detect a plurality of measuring points, or individual measuring points can be approached and determined by probing. After measuring or probing the relevant flanks of a tooth space, the measuring probe is retracted, i.e. moved out of the tooth space, and threaded into the next tooth space to be measured. It can be seen that the speed of a tactile measurement is limited due to the physical contact required between the measuring probe and the gearing.

For some years now, non-contact, optical metrology has frequently been used not only in general coordinate metrology, but also in the more specialized field of gear metrology. One reason for the use of optical metrology is the reduced measuring time with comparable quality of the measured data.

The optical measurement of gearings presents a particular challenge due to the geometry of the gearings and the nature of the surfaces to be measured. Due to the inclination and mutual shading of the teeth, it is often not possible to achieve optimum probing angles for optical measurement. Furthermore, the high reflectivity of the tooth flanks makes optical measurement difficult. Contamination, vibrations and temperature changes can also limit the function of an optical measuring system in measurements close to production. The challenge for optical gear metrology is therefore to meet the high demands placed on both absolute accuracy and reproducibility in gear metrology.

The ability of an optical measuring system to evaluate a certain amount of light within a certain time interval allows a conclusion to be drawn about the accuracy that can be achieved in a given period of time by means of optical measurement, i.e. how fast the optical measuring system works or can work. This is because the gain in measuring time, i.e. the reduction in measuring time compared to tactile systems, is a central requirement for justifying the use of optical measuring systems over tactile systems.

For the ability of an optical measurement system to evaluate a certain amount of light within a certain time interval, it is important, among other things, that the signal-to-noise ratio is sufficiently high. Furthermore, the quality of the optical measurement depends on the properties of optical components of a sensor head of the optical measurement system, such as the numerical aperture or the transmission, and other transmission properties of the components used, as well as on the efficiency of the detector, i.e. the quantum efficiency for CMOS or CCD based detectors.

Another decisive factor for the quality of an optical measuring system is the quality of the light source used, which can be assessed, for example, by the strength, bandwidth, stability and spectral homogeneity of the light source in question. This is particularly true in gear metrology, since the components cannot be specially prepared for measurement, e.g. by using chalk spray or the like.

SUMMARY

Against this background, the present disclosure is based on the technical problem of specifying a coordinate measuring machine that enables improved optical measurement of gearings.

The technical problem described above is solved by the independent claims. Further embodiments and further developments of the disclosure result from the dependent claims and the following description.

According to the disclosure, a coordinate measuring machine is specified, having two or more linear axes, having at least one rotational axis, having an optical distance sensor for detecting measuring points on a workpiece to be measured, and having a light source, wherein the linear axes and the rotational axis are adapted to carry out relative movements between the workpiece to be measured and the optical distance sensor, wherein the light source is adapted to provide source light for the optical distance sensor, and wherein the light source comprises: an illuminant mounted on a carrier board and comprising a material which emits broadband light under excitation, such as phosphorus or the like, a laser for exciting the illuminant by means of laser light, a device for actively regulating the light intensity of the source light generated by the light source, a device for actively regulating a temperature within the light source, an optical system, and a light guide, wherein the optical system is adapted to focus the source light into the light guide, and wherein the light guide is coupled to the optical distance sensor.

It has been shown that by combining active regulation of the temperature with active regulation of the light intensity, a particularly stable, broadband and spectrally homogeneous light source can be specified which is particularly well suited for gear measurement with an optical distance sensor. Thus, overall, an improved coordinate measuring machine for optical gear measurement can be specified.

The light guide can be an optical fiber.

The light guide can have a core diameter of 50 micrometers (µm).

The light guide can have a core diameter of 25 micrometers (µm).

The source light may include light emitted by the illuminant and laser light. The source light may therefore comprise a combination of laser light used to excite the illuminant and emitted light. For this reason, a distinction is made between "source light," "emitted light," and "laser light" in this text.

The source light is the light that is generated by the light source and introduced into the light guide to feed it to the optical distance sensor.

The emitted light is created by the excitation of the illuminant or the energy input of the laser light into the illuminant.

The laser light can also be called pump light and is generated by the laser.

While the laser light may have a specific wavelength, the emitted light is particularly broadband and has a wider wavelength range compared to the laser light.

The wavelength of the laser light may be different from the wavelength range of the emitted light, so that the wavelength of the laser light is not in the spectrum of the light emitted by the illuminant.

It may be provided that the source light comprises light emitted by the illuminant and no laser light. This can be achieved, for example, by a filter connected upstream of the input of the light guide filtering out the laser light or pump light essentially completely.

According to one embodiment of the coordinate measuring machine, it may be provided that the device for actively regulating the temperature comprises a heating device, such as a resistance heating element, a thermoelectric element or the like.

The device for actively regulating the temperature may have a cooling device.

The device for actively regulating the temperature may have an active cooling device, such as a cooling circuit with a cooling medium, a fan or the like.

Alternatively or complementarily, the device for actively regulating the temperature may have a passive cooling device, such as cooling fins or the like.

It may be provided that the device for actively regulating the temperature is adapted to regulate the temperature of the carrier board. The carrier board serves as a thermal interface for regulating the temperature of the illuminant, so that the temperature of the illuminant can be regulated indirectly via the carrier board.

It may be provided that the heating device, in particular the thermoelectric element, is coupled to the carrier board. It may be provided that the heating device, in particular the thermoelectric element, is integrated into the carrier board.

It may be provided that the active cooling device is coupled to the carrier board. It may be provided that the active cooling device is integrated into the carrier board. If a fan is provided, it may be adapted to supply the carrier board with cooling air.

It may be provided that the carrier board is coupled to the passive cooling device. It may be provided that the carrier board comprises the passive cooling device.

The device for actively regulating the temperature may comprise a thermoelectric element which is a heating device and a cooling device, such as a Peltier element or the like. For example, a predetermined target temperature can be set, which is adjusted by a heating or a cooling operation of the thermoelectric element, depending on the operating and environmental conditions.

The optical system can have two lenses, in particular two aspherical lenses. The optical system can have exactly two aspherical lenses.

The optical system may have more than two lenses. The optical system can have spherical and/or aspherical lenses.

The optical system may include a filter element, wherein the filter element is in particular a long-pass filter, wherein the long-pass filter is in particular transmissive to wavelengths greater than 475 nanometers (nm).

The filter element can be arranged between the lenses.

The light source may have another laser for exciting the illuminant by means of laser light. In particular, the light source can have exactly two lasers for exciting the illuminant by means of laser light.

The light source may include a light sensor for measuring a light intensity of the generated source light, such as a photodiode or the like.

The light sensor can be located between the lenses.

In particular, the device for actively regulating the light intensity can be connected to the light sensor and be adapted to regulate excitation of the illuminant by laser light on the basis of the light intensity measured by means of the light sensor. In particular, a power or a current of the laser can be regulated by means of the device for actively regulating the light intensity in order to regulate the energy input into the illuminant and thus adjust the light intensity. The device for actively regulating the light intensity is therefore used to regulate the laser or lasers.

Two or more light sensors may be provided.

The laser light may have a wavelength that is less than 500 nanometers (nm). In particular, the laser light can have a wavelength that is 450 nanometers (nm).

The light source may have a temperature sensor for measuring a temperature, in particular for measuring the temperature of the illuminant and/or the carrier board and/or the laser.

The device for actively regulating the temperature can be connected to the temperature sensor and be adapted to regulate active heating and/or active cooling of the illuminant and/or the carrier board and/or the laser on the basis of the temperature measured by means of the temperature sensor.

Two or more temperature sensors may be provided.

The light guide can be detachably and replaceably attached to a housing accommodating the optical system, in particular attached to the housing by means of a plug-in connection.

The optical system can be displaceable relative to the illuminant, in particular displaceable in a direction transverse to an optical axis of the optical system. In this way, the optical system can be positioned relative to the illuminant in such a way that a maximum light yield is achieved, i.e., the largest possible proportion of the light generated by excitation of the illuminant can be guided into the light guide by means of the optical system.

The light source may include a mechanical adjusting device for adjusting a relative position between the optical system and the illuminant. Thus, a relative position between the optical system and the illuminant can be adjusted and fixed in a simple manner.

The mechanical adjusting device may have two or more micrometer screws. Micrometer screws allow precise fine adjustment of the relative position of the optical system to the illuminant in a simple manner.

It may be provided that at least a first micrometer screw of the two or more micrometer screws is adapted to adjust a relative position between the optical system and the illuminant in a first direction, at least a second micrometer screw of the two or more micrometer screws is adapted to adjust a relative position between the optical system and the illuminant in a second direction, and the first direction is in particular oriented orthogonally to the second direction. For example, an adjustment of the relative position can be made in a planar plane oriented orthogonal to the optical axis of the optical system, wherein a first translational displacement of the optical system relative to the illuminant can be made along the first direction, and wherein a second translational displacement of the optical system relative to the illuminant can be made along the second direction.

The light source can have a device for adjusting the focus of the optical system, wherein the device for adjusting the focus is in particular mechanically designed and has an adjustment thread, wherein the adjustment thread is adapted to convert a rotation into a translational focus shift, in particular into a translational focus shift along the optical axis of the optical system.

The coordinate measuring machine can have a counter for counting active operating hours of the light source. This allows a wear condition of the light source, laser(s), and other components to be determined based on the hours of operation.

It may be provided that the light source is a broadband white light source, wherein the light source is adapted to generate source light having a bandwidth greater than 20 nanometers (nm), and wherein the light source is adapted to generate wavelengths greater than 400 nanometers (nm) and less than 700 nanometers (nm).

The distance sensor can be a confocal chromatic distance sensor.

The optical distance sensor can be a point sensor for optical distance measurement. In particular, the point sensor can measure individual measuring points one after the other. Each individual measuring point can be detected independently and separately from other measuring points by means of the point sensor. This means that by means of the point sensor it may be possible in particular to detect a single measuring point without simultaneously detecting further measuring points. Three spatial coordinates can be assigned to each individual measuring point, e.g. an x-value, a y-value and a z-value in a Cartesian coordinate system x-y-z.

It may be provided that a focus diameter of the optical distance sensor is 50 microns or less, in particular 20 microns or less.

It may be provided that the point sensor for optical distance measurement has a depth resolution.

For example, as viewed along an optical axis of the point sensor, a depth, i.e. a distance of the optically probed surface or tooth flank along the optical axis in a predetermined coordinate system, can be measured in a depth measuring range along the optical axis, e.g. a distance to an origin of the predetermined coordinate system or to another geometric reference, such as the position of a lens or the like. It may be provided that the distance measurement is one-dimensional along an optical axis and three-dimensional measurement values are calculated based on the position of the optical measurement system.

For example, as viewed along an optical axis of the point sensor, a depth, i.e. a distance of the optically probed surface or tooth flank along the optical axis in a predetermined coordinate system, e.g. a distance to an origin of the predetermined coordinate system or to another geometric reference, such as the position of a lens or the like, can be measured in a depth measurement range of a few centimeters or a few millimeters or in a depth measurement range of less than one millimeter along the optical axis. Based on the distance information of the point sensor, in particular, a three-dimensional measuring point can be generated, wherein information on axis positions of the coordinate measuring machine can be considered which carries the optical point sensor. It may be provided that the distance measurement takes place one-dimensionally along an optical axis and three-dimensional measured values are calculated on the basis of the position of the optical distance sensor.

It may be provided that the coordinate measuring machine has two or more point sensors for optical distance measurement.

It may be provided that point sensors are arranged lined up along a line or distributed like a grid in rows and columns. Each of the point sensors is therefore adapted in particular in the manner described above for optical distance measurement and has in particular a depth measurement range with a depth resolution along an optical axis. The point sensors can simultaneously record measured values.

In particular, the coordinate measuring machine does not have a camera for optical measurement of a workpiece geometry. In particular, the coordinate measuring machine does not have a camera for two-dimensional imaging.

It may be provided that in particular no camera is provided for the acquisition of measuring points by image or pixel analysis. In particular, it may be provided that no camera for two-dimensional imaging is provided for the acquisition of measuring points by image or pixel analysis.

Measuring points are recorded in particular on the respective tooth flanks of a gearing at a distance from edge areas of the respective tooth flanks.

It may be provided that an optical axis of the optical distance sensor during the detection of a measuring point on a tooth flank encloses an angle with the tooth flank that is not equal to 90°. In other words, it may be provided that a normal on the tooth flank originating from the measuring point is not oriented collinearly to the optical axis.

It may be provided that a plurality of measuring points are detected on a respective tooth flank along a tooth width, i.e. in flank line direction. It may be provided that a plurality of measuring points along a tooth width, i.e. in the flank line direction, are detected as individual measuring points on a respective tooth flank, wherein in particular a first individual measuring point in the flank line direction is detected in time before a second individual measuring point in the flank line direction.

The terms tooth flank and flank are used synonymously in this document.

The coordinate measuring machine can in particular be a gear measuring machine. The gear measuring machine can be set up to provide correction parameters for a gear cutting machine, such as a gear grinding machine and/or a gear milling machine, on the basis of deviations of a measured gearing from a predefined nominal gearing geometry.

The coordinate measuring machine can have a tactile measuring device having a measuring probe for detecting measuring points on the workpiece to be measured. The coordinate measuring machine can thus have a tactile measuring system for tactile gear measurement in addition to the optical distance sensor.

The coordinate measuring machine can be characterized in that a simulated light source is provided, in that a switching device is provided to switch the laser of the light source on and off or to pulse it, and in that the simulated light source is adapted to simulate operating parameters of the light source in case the laser is switched off or is in pulsed mode and to transfer them to the device for actively regulating the light intensity and/or the device for actively regulating the temperature.

The regulation of the light intensity can be carried out in particular by a short-time, alternating switching on and off of the laser, i.e. by a so-called pulsing. In order to avoid a too strong regulation response of the device for actively regulating the light intensity and/or the device for actively regulating the temperature, simulated operating parameters can be transferred to the device for actively regulating the light intensity and/or the device for actively regulating the temperature, so that it appears to the device for actively regulating the light intensity and/or the device for actively regulating the temperature that the laser is permanently switched on. The foregoing can be equally applied to the case where two or more lasers are provided, in which case two or more lasers are pulsed, and the simulated light source generates simulated operating parameters of the light source.

The simulated light source can be provided by an electrical circuit that simulates the electrical properties of the light source but does not itself illuminate.

For example, simulated sensor signals can be generated by means of the electrical circuit and transferred to the device for actively regulating the light intensity and/or the device for actively regulating the temperature, the values of which correspond to those sensor signals which would be transferred to the device for actively regulating the light intensity and/or the device for actively regulating the temperature during operation with the light source switched on. Accordingly, it still appears to the device for actively regulating the light intensity and/or the device for actively regulating the temperature that the light source is switched on. The simulated light source can therefore be generated at signal level, for example.

Alternatively, the simulated light source can be provided in a software-based manner. When the light source is switched off and/or in pulsed mode, a simulated light source can be "activated" by software. In this case, it may be provided, for example, that the device for actively regulating the light intensity and/or the device for actively regulating the temperature do not generate changed manipulated variables despite changed sensor data. In this case, therefore, no simulated signals are generated at the signal level to create the appearance of continuous operation of the light source for actively regulating the light intensity and/or the device for actively regulating the temperature, but the input data of the sensors processed in the control software are overwritten and replaced by values that reflect continuous operation of the light source.

Alternatively, it may be provided that the regulation operation of the device for actively regulating the light intensity and/or the device for actively regulating the temperature is "frozen" in each case in the event of the light source being switched off and switched on again or in the event of pulse operation, and the device for actively regulating the light intensity and/or the device for actively regulating the temperature continues to be operated with unchanged operating parameters for a predefined period of time, regardless of changed input signals.

It may be provided that the coordinate measuring machine has three or more linear axes.

It may be provided that the coordinate measuring machine has exactly three linear axes and exactly one rotational axis.

It may be provided that the optical distance sensor is translationally movable by means of the linear axes and that the rotational axis is set up to pick up and rotate a component about a longitudinal axis or rotational axis.

The terms "component" and "workpiece" are used synonymously in this text.

The coordinate measuring device can be adapted to move the component relative to the optical distance sensor during the detection of the measuring points. In particular, the component may be rotated about an axis. In particular, the component may be rotated about an axis while the optical distance sensor is stationary and/or moved by means of one or more linear axes.

The coordinate measuring device can be adapted to continuously move the component relative to the optical distance sensor during the detection of the measuring points. In particular, the component can be rotated continuously about an axis while the optical distance sensor is stationary and/or moved by means of one or more linear axes.

The present disclosure relates to a light source, having an illuminant mounted on a carrier board and comprising a material which emits broadband light under excitation, such as phosphorus or the like, having a laser for exciting the illuminant by means of laser light, having a device for actively regulating the light intensity of a source light generated by the light source, having a device for actively regulating a temperature within the light source, having an optical system, and having a light guide which can be coupled to an optical distance sensor, or having an output for connecting a light guide, wherein the optical system is adapted to focus the source light into the light guide or the output.

It has been shown that by combining active regulation of the temperature with active regulation of the light intensity, it is possible to provide a particularly stable, broadband and spectrally homogeneous light source that is especially well suited for gear measurement with an optical distance sensor.

All of the features previously described with reference to the light source of the coordinate measuring machine can apply equally to the light source according to the disclosure, or can be part of the light source according to the disclosure.

According to a further aspect of the disclosure, a method is given comprising the method steps of: providing a light source according to the disclosure or a coordinate measuring machine according to the disclosure; active regulation of the light intensity of the source light generated by the light source; and active regulation of the temperature within the light source.

It may be provided that a simulated light source, in the event that the laser is switched off, simulates operating parameters of the light source and transfers them to the device for actively regulating the light intensity of the light source and/or the device for actively regulating the temperature.

BRIEF DESCRIPTION OF THE DRAWINGS

The disclosure is described in more detail below with reference to a drawing which illustrates exemplary embodiments. In each case, the figures schematically show.

DETAILED DESCRIPTION OF THE DRAWINGS

Figure 1:
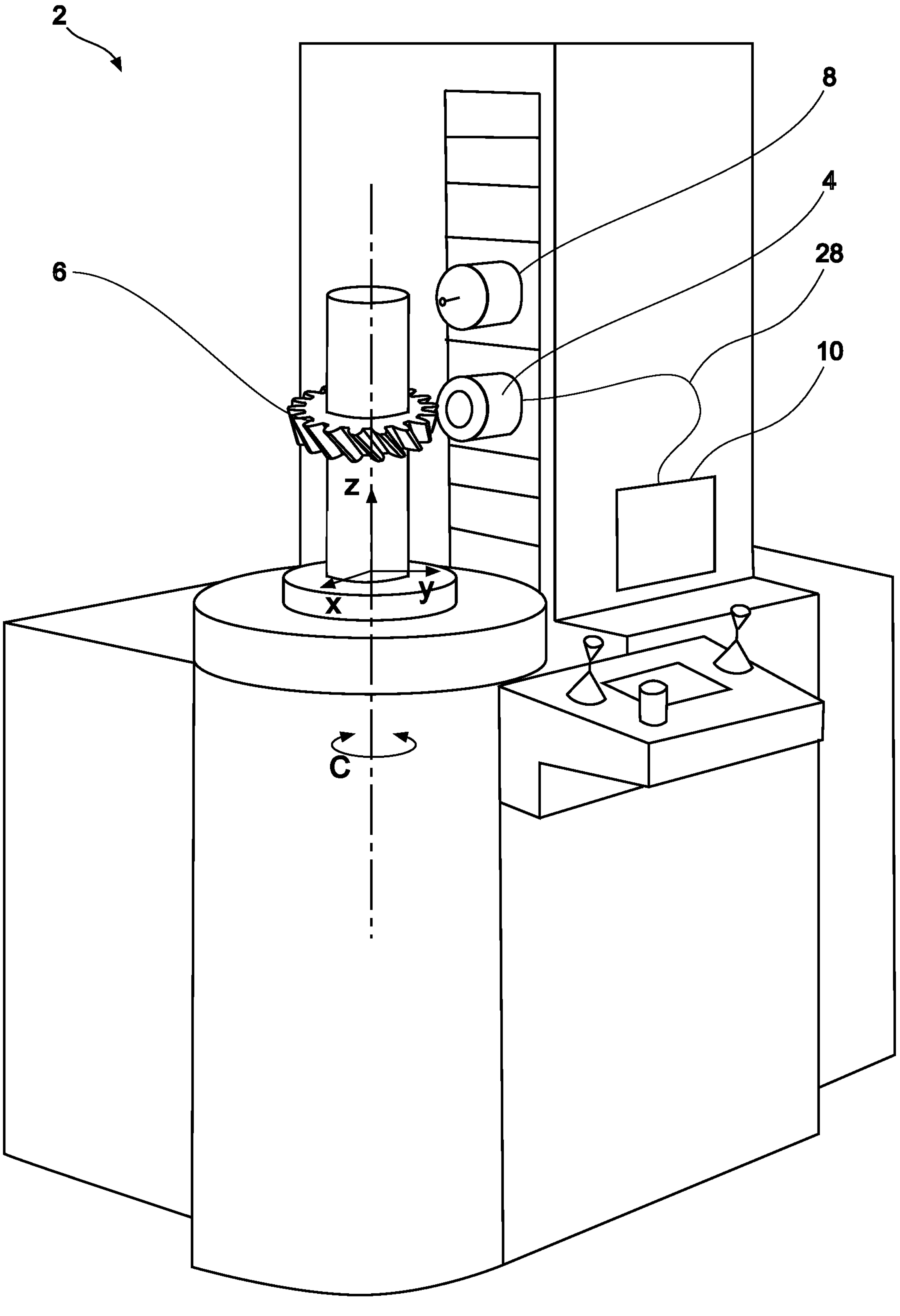
FIG. 1 shows a coordinate measuring machine according to the disclosure.

FIG. 1 shows a coordinate measuring machine 2 according to the disclosure.

The coordinate measuring machine 2 has three linear axes x, y and z and a rotational axis C. In the drawing, the reference signs x, y, z with their associated arrows represent both a Cartesian coordinate system and CNC-controlled linear axes and their respective translational degree of freedom for performing relative measuring movements. The same applies to the rotational axis with the reference sign C, wherein the reference sign C represents both a rotational degree of freedom for executing relative measuring movements and a CNC-controlled rotary drive.

The coordinate measuring machine 2 has an optical distance sensor 4 for optically detecting measuring points on a workpiece 6 to be measured.

The coordinate measuring machine 2 has a measuring probe 8 for tactile detection of measuring points on the workpiece 6 to be measured. The workpiece 6 to be measured is a gearing. The coordinate measuring machine 2 is a gear measuring machine.

Figure 2:
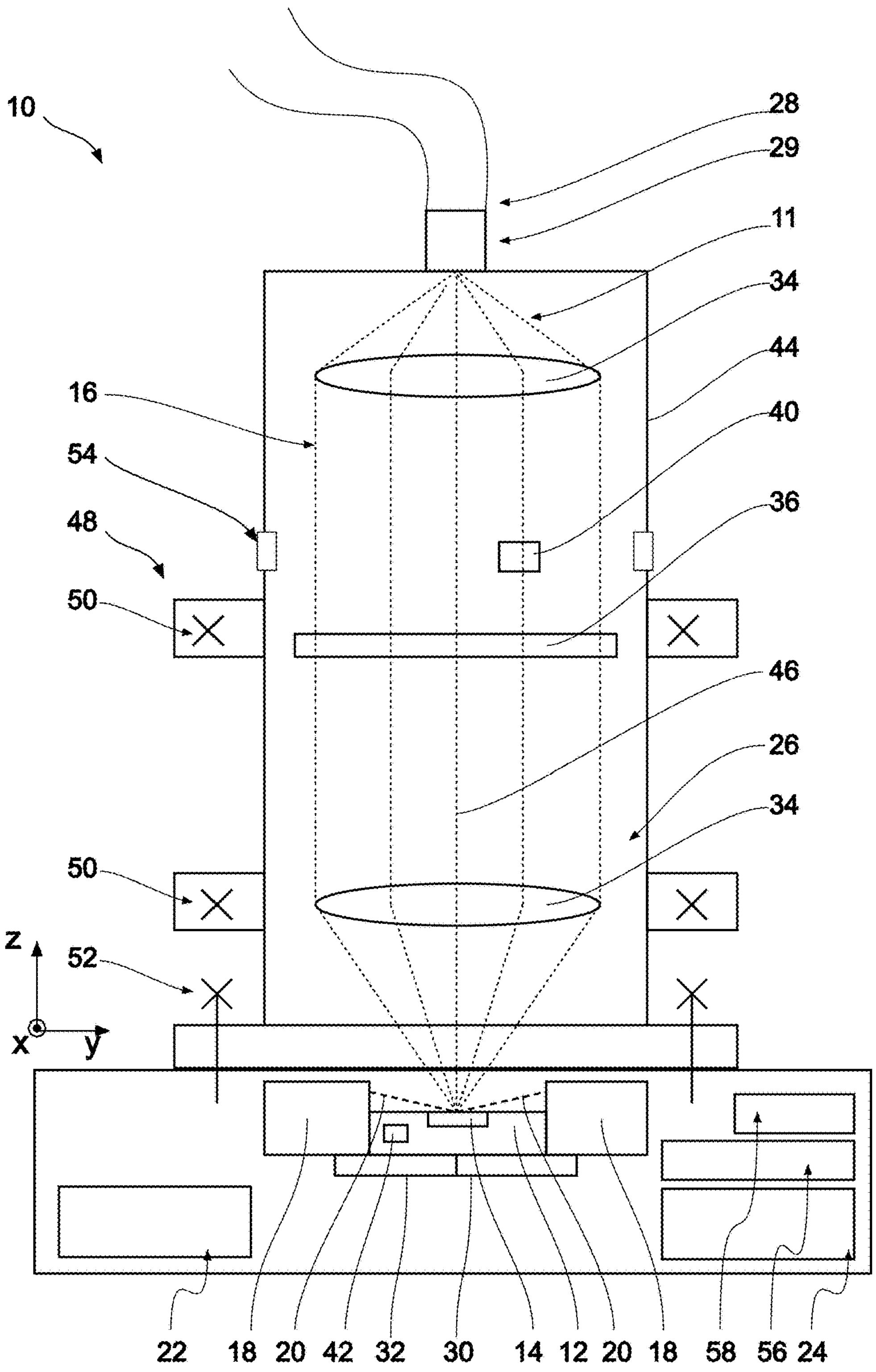
FIG. 2 shows a light source according to the disclosure.

The coordinate measuring machine 2 has a light source 10 according to the disclosure for providing source light 11 for the optical distance sensor 4. The light source 10 is described below with reference to FIG. 2.

The light source 10 has an illuminant 14 mounted on a carrier board 12, which has a material, such as phosphorus or the like, which emits broadband light 16 when excited, in particular emits white light.

The light source 10 has two lasers 18 for exciting the illuminant 14 using laser light 20.

The light source 10 has a device 22 for actively regulating the light intensity of the source light 11 generated by the light source 10. For this purpose, the device 22 regulates the power of the lasers 18 and thus the energy input of the lasers 18 into the illuminant 14.

The light source 10 has a device 24 for actively regulating a temperature within the light source 10—and in this case for actively regulating a temperature of the carrier board 12.

The light source 10 has an optical system 26 and a light guide 28, wherein the optical system 26 is adapted to focus the source light 11 into the light guide 28. The light guide 28 is coupled to the optical distance sensor 4 (FIG. 1).

The device 24 for actively regulating the temperature has a heating device 30. The heating device 30 is a thermoelectric element.

The device 24 for actively regulating the temperature includes an active cooling device 32.

According to alternative embodiments, it may be provided that the device 24 for actively regulating the temperature is a thermoelectric element which is a heating device and a cooling device, namely a Peltier element.

The optical system 26 has two aspherical lenses 34.

A filter element 36 is arranged between the lenses 34.

The filter element 36 is a long-pass filter, wherein the long-pass filter is transmissive to wavelengths greater than 475 nanometers (nm). The laser light 20, which has a wavelength of 450 nanometers (nm), is therefore substantially completely filtered out. Accordingly, only light 16 emitted by the illuminant 14 enters the light guide 28 as source light 11. According to alternative exemplary embodiments, it may be provided that a combination of laser light 20 and emitted light 16 is focused into the light guide 28 as source light 11.

The light source 10 has a light sensor 40 for measuring the light intensity of the generated source light 11. The light sensor 40 is a photodiode. The light sensor 40 is arranged between the lenses 34.

The device 22 for regulating the light intensity uses the light intensity measured by the light sensor 40 as a measured value to adjust or regulate the power of the lasers 18.

The light source 10 has a temperature sensor 42 for measuring the temperature of the carrier board 12, and the device 24 for regulating the temperature of the carrier board 12 uses the temperature measured by the temperature sensor 42 to regulate the active heating means 30 and the active cooling means 32.

The light guide 28 is removably and interchangeably attached to a housing 44 which accommodates the optical system 26, which is provided by means of a plug-in connection 29.

The optical system 26 is displaceable relative to the illuminant 14, namely displaceable in a direction transverse to an optical axis 46 of the optical system 26. To this end, the light source 10 includes a mechanical adjusting device 48 for adjusting a relative position between the optical system 26 and the illuminant 14. The mechanical adjusting device 48 comprises micrometer screws 50, 52.

First micrometer screws 50 are used to adjust a relative position between the optical system 26 and the illuminant 14 in a first direction x.

Second micrometer screws 52 are used to adjust a relative position between optical system 26 and illuminant 14 in a second direction y. The first direction x is oriented orthogonally to the second direction y.

The light source 10 has a device for focus adjustment of the optical system 26, wherein the device for focus adjustment is mechanically configured and includes an adjustment thread 54. The adjustment thread 54 is adapted to convert rotation into translational focus shift along the optical axis 46, i.e., in the z-direction.

The light source 10 is a broadband white light source, wherein the light source is adapted to generate source light having a bandwidth greater than 20 nanometers (nm) and wherein the light source is adapted to generate wavelengths greater than 400 nanometers (nm) and less than 700 nanometers (nm).

The distance sensor 4 is a confocal chromatic distance sensor.

The light source 10 has a simulated light source 56. The simulated light source 56 is an electrical circuit that simulates the electrical characteristics of the light source 10 but does not itself illuminate.

The light source 10 has a switching device 58, which is provided to switch the lasers 18 of the light source 10 on and off—in this case to pulse them.

The simulated light source 56 is adapted to simulate operating parameters of the light source 10 in the event that the lasers 18 are off, or during pulsed operation, and to provide such parameters to the device 22 for actively regulating the light intensity of the light source 10 and the device 24 for actively regulating the temperature within the light source 10.

The invention claimed is:

1. A coordinate measuring machine comprising:

two or more linear axes, a rotational axis, an optical distance sensor for detecting measuring points on a workpiece to be measured, and a light source, wherein the linear axes and the rotational axis are adapted to carry out relative movements between the workpiece to be measured and the optical distance sensor, wherein the light source is adapted to provide source light for the optical distance sensor and wherein the light source comprises:

an illuminant mounted on a carrier board and comprising a material which emits broadband light under excitation, a laser for exciting the illuminant by laser light, a device for actively regulating the light intensity of the source light generated by the light source, a device for actively regulating a temperature within the light source, a light sensor for measuring a light intensity of the generated source light, a temperature sensor for measuring the temperature of the carrier board, an optical system, and a light guide, wherein the optical system is adapted to focus the source light into the light guide, wherein the light guide is coupled to the optical distance sensor, wherein the device for actively regulating the light intensity is connected to the light sensor and is adapted to regulate a power of the laser on the basis of the light intensity measured using the light sensor, and wherein the device for actively regulating the temperature is connected to the temperature sensor and is adapted to regulate the temperature of the carrier board on the basis of the temperature measured using the temperature sensor.

2. The coordinate measuring machine according to claim 1, wherein the device for actively regulating the temperature comprises a heating device, and/or the device for actively regulating the temperature comprises a cooling device, wherein the device for actively regulating the temperature comprises an active cooling device, and/or in that the device for actively regulating the temperature comprises a passive cooling device, and/or that the device for actively regulating the temperature comprises a thermoelectric element which is a heating device and a cooling device.

3. The coordinate measuring machine according to claim 1, wherein the optical system has two lenses, and/or the optical system has a filter element, wherein the filter element is a long-pass filter, wherein the long-pass filter is transmissive to wavelengths greater than 475 nm, and the filter element is arranged between the lenses.

4. The coordinate measuring machine according to claim 3, wherein the light sensor is arranged between the lenses.

5. The coordinate measuring machine according to claim 1, wherein the laser light has a wavelength that is less than 500 nm.

6. The coordinate measuring machine according to claim 1, wherein a temperature sensor is provided for measuring a temperature of the illuminant and/or the laser, and/or the light guide is detachably and replaceably attached to a housing accommodating the optical system, and is attached to the housing by a plug-in connection.

7. The coordinate measuring machine according to claim 1, wherein the optical system is displaceable relative to the illuminant, in a direction transverse to an optical axis of the optical system.

8. The coordinate measuring machine according to claim 1, wherein a mechanical adjusting device is provided for adjusting a relative position between the optical system and the illuminant, wherein the mechanical adjusting device comprises two or more micrometer screws, wherein at least a first micrometer screw of the two or more micrometer screws is adapted to adjust a relative position between the optical system and the illuminant in a first direction, wherein at least a second micrometer screw of the two or more micrometer screws is adapted to adjust a relative position between the optical system and the illuminant in a second direction, and the first direction is oriented orthogonally to the second direction.

9. The coordinate measuring machine according to claim 1, wherein a device for adjusting the focus of the optical system is provided, wherein the device for adjusting the focus is mechanically designed and has an adjustment thread, wherein the adjustment thread is adapted to convert a rotation into a translational focus shift.

10. The coordinate measuring machine according to claim 1, wherein a counter for counting active operating hours of the light source is provided, and/or a further laser is provided for exciting the illuminant by laser light, and/or the distance sensor is a confocal chromatic distance sensor, and/or a tactile measuring device is provided with a measuring probe for detecting measuring points on the workpiece to be measured, and/or the light source is a broadband white light source, wherein the light source is adapted to generate source light having a bandwidth greater than 20 nm, and wherein the light source is adapted to generate wavelengths greater than 400 nm and less than 700 nm.

11. The coordinate measuring machine according to claim 1, wherein a simulated light source is provided, a switching means is provided to switch the laser of the light source on and off or to pulse it, and the simulated light source is adapted to simulate operating parameters of the light source in case the laser is switched off or is in pulsed operation and to transfer them to the device for actively regulating the light intensity and/or to the device for actively regulating the temperature.

12. A light source comprising:

an illuminant mounted on a carrier board and comprising a material which emits broadband light under excitation, a laser for exciting the illuminant by laser light, a device for actively regulating the light intensity of a source light generated by the light source, a device for actively regulating a temperature within the light source, a light sensor for measuring a light intensity of the generated source light, a temperature sensor for measuring a temperature of the carrier board, an optical system, and a light guide which can be coupled to an optical distance sensor, or having an output for connecting a light guide, wherein the optical system is adapted to focus the source light into the light guide or output, wherein the device for actively regulating the light intensity is connected to the light sensor and is adapted to regulate a power of the laser on the basis of the light intensity measured using the light sensor, and wherein the device for actively regulating the temperature is connected to the temperature sensor and is adapted to regulate the temperature of the carrier board on the basis of the temperature measured using the temperature sensor.

13. A method including the following steps: providing a light source comprising an illuminant mounted on a carrier board and comprising a material which emits broadband light under excitation, a laser for exciting the illuminant by laser light, a device for actively regulating the light intensity of a source light generated by the light source, a device for actively regulating a temperature within the light source, a light sensor for measuring a light intensity of the generated source light, a temperature sensor for measuring a temperature of the carrier board, an optical system, and a light guide which can be coupled to an optical distance sensor, or having an output for connecting a light guide, wherein the optical system is adapted to focus the source light into the light guide or output, wherein the device for actively regulating the light intensity is connected to the light sensor and is adapted to regulate a power of the laser on the basis of the light intensity measured using the light sensor, and wherein the device for actively regulating the temperature is connected to the temperature sensor and is adapted to regulate the temperature of the carrier board on the basis of the temperature measured using the temperature sensor, or a coordinate measuring machine comprising two or more linear axes, a rotational axis, an optical distance sensor for detecting measuring points on a workpiece to be measured, and a light source, wherein the linear axes and the rotational axis are adapted to carry out relative movements between the workpiece to be measured and the optical distance sensor, wherein the light source is adapted to provide source light for the optical distance sensor and wherein the light source comprises an illuminant mounted on a carrier board and comprising a material which emits broadband light under excitation, a laser for exciting the illuminant by laser light, a device for actively regulating the light intensity of the source light generated by the light source, a device for actively regulating a temperature within the light source, a light sensor for measuring a light intensity of the generated source light, a temperature sensor for measuring the temperature of the carrier board, an optical system, and a light guide, wherein the optical system is adapted to focus the source light into the light guide, and wherein the light guide is coupled to the optical distance sensor, wherein the device for actively regulating the light intensity is connected to the light sensor and is adapted to regulate a power of the laser on the basis of the light intensity measured using the light sensor, and wherein the device for actively regulating the temperature is connected to the temperature sensor and is adapted to regulate the temperature of the carrier board on the basis of the temperature measured using the temperature sensor; actively regulating the light intensity of the source light generated by the light source, and actively regulating the temperature inside the light source.

14. The method, according to claim 13, wherein a simulated light source, in the event the laser is switched off or in pulsed mode, simulates operating parameters of the light source and transmits them to the device for actively regulating the light intensity and/or the device for actively regulating the temperature, wherein a switching means is provided to switch the laser of the light source on and off or to pulse it, and the simulated light source is adapted to simulate operating parameters of the light source in case the laser is switched off or is in pulsed operation and to transfer them to the device for actively regulating the light intensity and/or to the device for actively regulating the temperature.

* * * * *